United States Patent [19]
Whaley et al.

[11] Patent Number: 5,828,508
[45] Date of Patent: Oct. 27, 1998

[54] TECHNIQUE FOR REDUCING OVERHEAD IN A DATA STORAGE SYSTEM

[75] Inventors: Jeffrey L. Whaley, Boulder; Robert L. Metz, Westminster, both of Colo.

[73] Assignee: Maxtor Corporation, Longmont, Colo.

[21] Appl. No.: 733,964

[22] Filed: Oct. 17, 1996

[51] Int. Cl.⁶ ........................................................ G11B 5/09
[52] U.S. Cl. .............................. 360/49; 360/48; 360/53; 371/2.1
[58] Field of Search .................................. 360/48, 49, 53, 360/78.14, 77.08, 72.2; 371/2.1, 2.2

[56] References Cited

U.S. PATENT DOCUMENTS

| | | |
|---|---|---|
| Re. 34,003 | 7/1992 | Weng . |
| 5,049,879 | 9/1991 | Symonds . |
| 5,237,574 | 8/1993 | Weng ...................................... 360/49 X |
| 5,268,800 | 12/1993 | Nielsen . |
| 5,274,509 | 12/1993 | Buch . |
| 5,274,510 | 12/1993 | Sugita et al. . |
| 5,276,564 | 1/1994 | Hessing et al. . |
| 5,285,327 | 2/1994 | Hetzler . |
| 5,321,560 | 6/1994 | Cowen . |
| 5,327,299 | 7/1994 | Nishikawa et al. . |
| 5,339,207 | 8/1994 | Moon et al. . |
| 5,384,671 | 1/1995 | Fisher . |
| 5,386,402 | 1/1995 | Iwata . |
| 5,459,623 | 10/1995 | Blagaila et al. . |
| 5,500,848 | 3/1996 | Best et al. . |
| 5,596,460 | 1/1997 | Greenberg et al. .................... 360/49 X |

FOREIGN PATENT DOCUMENTS 4-302864  3/1991  Japan .

Primary Examiner—Aristotelis M. Psitos
Assistant Examiner—Alan Faber
Attorney, Agent, or Firm—Sheridan Ross P.C.

[57] ABSTRACT

Separate servo parameter values are combined into a single servo parameter value having a bit length shorter than the total bit length of the separate parameter values. The combined parameter value is then stored in a servo field on a storage disk. By storing the shorter combined parameter, a given amount of servo information can be stored in a smaller space on the disk, thereby reducing overhead. In one embodiment, servo parameters are added together to create the combined parameters. In another embodiment, an equation is provided for creating the combined parameters, that results in a relatively large numerical distance between combined parameters in adjacent servo sectors on a track of the storage disk. The combined parameters stored on the disk can be used, for example, to check the accuracy of software position estimators in the disk drive.

14 Claims, 10 Drawing Sheets

| SECTOR NUMBERS FOR TRACK A | 1 | 2 | 3 | 4 | 5 | 6 | 7 | 8 | 9 | 10 |
|---|---|---|---|---|---|---|---|---|---|---|
| LSBs OF CYLINDER NUMBER FOR TRACK A | 6 | 6 | 6 | 6 | 6 | 6 | 6 | 6 | 6 | 6 |
| MSBs OF CYLINDER NUMBER FOR TRACK A | 0 | 1 | 1 | 0 | 1 | 1 | 0 | 0 | 1 | 1 |
| INDEX PATTERN | 0 | 1 | 2 | 3 | 0 | 1 | 2 | 3 | 0 | 1 |
| STORED VALUE | 6 | 8 | 9 | 9 | 7 | 8 | 8 | 9 | 7 | 8 |
| SECTOR COUNTER | 0 | 1 | 2 | 3 | 4 | * | 5 | 6 | 8 | 9 |
| MISSING UPDATE | | | | | | x | | | | |
| COUNTER MOD 4 | 0 | 1 | 2 | 3 | 0 | * | 1 | 2 | 0 | 1 |
| STORED VALUE - COUNTER MOD 4 | 6 | 7 | 7 | 6 | 7 | * | 7 | 7 | 7 | 7 |
| MSB (ASSUMED) | 0 | 1 | 1 | 0 | 1 | * | 1 | 0 | 1 | 1 |
| LSB (CALCULATED) | 6 | 6 | 6 | 6 | 6 | * | 6 | 7 | 6 | 6 |

| SECTOR | CYLINDER | MODULATION | STORED VALUE |
|---|---|---|---|
| 0 | 6 | 0 | 6 |
| 1 | 6 | 1 | 7 |
| 2 | 6 | 2 | 8 |
| 3 | 6 | 3 | 9 |
| 4 | 6 | 0 | 6 |
| 5 | 6 | 1 | 7 |
| 6 | 6 | 2 | 8 |
| 7 | 6 | 3 | 9 |
| 8 | 6 | 0 | 6 |
| 9 | 6 | 1 | 7 |
| 10 | 6 | 2 | 8 |
| 11 | 6 | 3 | 9 |
| 12 | 6 | 0 | 6 |
| 13 | 6 | 1 | 7 |
| 14 | 6 | 2 | 8 |
| 15 | 6 | 3 | 9 |
| 16 | 6 | 0 | 6 |
| 17 | 6 | 1 | 7 |
| 18 | 6 | 2 | 8 |
| 19 | 6 | 3 | 9 |
| 20 | 6 | 0 | 6 |
| 21 | 6 | 1 | 7 |
| 22 | 6 | 2 | 8 |
| 23 | 6 | 3 | 9 |
| 24 | 6 | 0 | 6 |
| 25 | 6 | 1 | 7 |

FIG. 3A

| SECTOR | CYLINDER | MODULATION | STORED VALUE |
|---|---|---|---|
| 26 | 6 | 2 | 8 |
| 27 | 6 | 3 | 9 |
| 28 | 6 | 0 | 6 |
| 29 | 6 | 1 | 7 |
| 30 | 6 | 2 | 8 |
| 31 | 6 | 3 | 9 |
| 32 | 6 | 0 | 6 |
| 33 | 6 | 1 | 7 |
| 34 | 6 | 2 | 8 |
| 35 | 6 | 3 | 9 |
| 36 | 6 | 0 | 6 |
| 37 | 6 | 1 | 7 |
| 0 | 6 | 0 | 6 |

←INDEX

| SECTOR NUMBERS FOR TRACK A | 1 | 2 | 3 | 4 | 5 | 6 | 7 | 8 | 9 | 10 |
|---|---|---|---|---|---|---|---|---|---|---|
| LSBs OF CYLINDER NUMBER FOR TRACK A | 6 | 6 | 6 | 6 | 6 | 6 | 6 | 6 | 6 | 6 |
| MSBs OF CYLINDER NUMBER FOR TRACK A | 0 | 1 | 1 | 0 | 1 | 1 | 0 | 0 | 1 | 1 |
| INDEX PATTERN | 0 | 1 | 2 | 3 | 0 | 1 | 2 | 3 | 0 | 1 |
| STORED VALUE | 6 | 8 | 9 | 9 | 7 | 8 | 8 | 9 | 7 | 8 |
| SECTOR COUNTER | 0 | 1 | 2 | 3 | 4 | * | 5 | 6 | 8 | 9 |
| MISSING UPDATE | | | | | | × | | | | |
| COUNTER MOD 4 | 0 | 1 | 2 | 3 | 0 | * | 1 | 2 | 0 | 1 |
| STORED VALUE - COUNTER MOD 4 | 6 | 7 | 7 | 6 | 7 | * | 7 | 7 | 7 | 7 |
| MSB (ASSUMED) | 0 | 1 | 1 | 0 | 1 | * | 1 | 0 | 1 | 1 |
| LSB (CALCULATED) | 6 | 6 | 6 | 6 | 6 | * | 6 | 7 | 6 | 6 |

| CYLINDER | 100 | 101 | 102 | 103 | 104 | 105 | 106 | 107 | 108 | DELTA |
|---|---|---|---|---|---|---|---|---|---|---|
| SECTOR | | | | | | | | | | |
| 14 | 106 | 107 | 108 | 109 | 110 | 111 | 112 | 113 | 114 | 37 |
| 15 | 143 | 144 | 145 | 146 | 147 | 148 | 149 | 150 | 151 | 37 |
| 16 | 180 | 181 | 182 | 183 | 184 | 185 | 186 | 187 | 188 | 37 |
| 17 | 217 | 218 | 219 | 220 | 221 | 222 | 223 | 224 | 225 | 37 |
| 18 | 254 | 255 | 0 | 1 | 2 | 3 | 4 | 5 | 6 | 37 |
| 19 | 35 | 36 | 37 | 38 | 39 | 40 | 41 | 42 | 43 | 37 |
| 20 | 72 | 73 | 74 | 75 | 76 | 77 | 78 | 79 | 80 | 37 |
| 21 | 109 | 110 | 111 | 112 | 113 | 114 | 115 | 116 | 117 | 37 |
| 22 | 146 | 147 | 148 | 149 | 150 | 151 | 152 | 153 | 154 | 37 |
| 23 | 183 | 184 | 185 | 186 | 187 | 188 | 189 | 190 | 191 | 37 |
| 24 | 220 | 221 | 222 | 223 | 224 | 225 | 226 | 227 | 228 | 37 |
| 25 | 1 | 2 | 3 | 4 | 5 | 6 | 7 | 8 | 9 | 37 |
| 26 | 38 | 39 | 40 | 41 | 42 | 43 | 44 | 45 | 46 | 37 |
| 27 | 75 | 76 | 77 | 78 | 79 | 80 | 81 | 82 | 83 | 37 |
| 28 | 112 | 113 | 114 | 115 | 116 | 117 | 118 | 119 | 120 | 37 |

FIG. 5B

| CYLINDER | 100 | 101 | 102 | 103 | 104 | 105 | 106 | 107 | 108 | DELTA |
|---|---|---|---|---|---|---|---|---|---|---|
| SECTOR | | | | | | | | | | |
| 29 | 149 | 150 | 151 | 152 | 153 | 154 | 155 | 156 | 157 | 37 |
| 30 | 186 | 187 | 188 | 189 | 190 | 191 | 192 | 193 | 194 | 37 |
| 31 | 223 | 224 | 225 | 226 | 227 | 228 | 229 | 230 | 231 | 37 |
| 32 | 4 | 5 | 6 | 7 | 8 | 9 | 10 | 11 | 12 | 37 |
| 33 | 41 | 42 | 43 | 44 | 45 | 46 | 47 | 48 | 49 | 37 |
| 34 | 78 | 79 | 80 | 81 | 82 | 83 | 84 | 85 | 86 | 37 |
| 35 | 115 | 116 | 117 | 118 | 119 | 120 | 121 | 122 | 123 | 37 |
| 36 | 152 | 153 | 154 | 155 | 156 | 157 | 158 | 159 | 160 | 37 |
| 37 | 189 | 190 | 191 | 192 | 193 | 194 | 195 | 196 | 197 | 37 |
| 38 | 226 | 227 | 228 | 229 | 230 | 231 | 232 | 233 | 234 | 37 |
| 39 | 7 | 8 | 9 | 10 | 11 | 12 | 13 | 14 | 15 | 37 |
| 40 | 44 | 45 | 46 | 47 | 48 | 49 | 50 | 51 | 52 | 37 |
| 41 | 81 | 82 | 83 | 84 | 85 | 86 | 87 | 88 | 89 | 37 |
| 42 | 118 | 119 | 120 | 121 | 122 | 123 | 124 | 125 | 126 | 37 |
| 43 | 155 | 156 | 157 | 158 | 159 | 160 | 161 | 162 | 163 | 37 |

FIG. 5C

| CYLINDER | 100 | 101 | 102 | 103 | 104 | 105 | 106 | 107 | 108 | DELTA |
|---|---|---|---|---|---|---|---|---|---|---|
| SECTOR | | | | | | | | | | |
| 44 | 192 | 193 | 194 | 195 | 196 | 197 | 198 | 199 | 200 | 37 |
| 45 | 229 | 230 | 231 | 232 | 233 | 234 | 235 | 236 | 237 | 37 |
| 46 | 10 | 11 | 12 | 13 | 14 | 15 | 16 | 17 | 18 | 37 |
| 47 | 47 | 48 | 49 | 50 | 51 | 52 | 53 | 54 | 55 | 37 |
| 48 | 84 | 85 | 86 | 87 | 88 | 89 | 90 | 91 | 92 | 37 |
| 49 | 121 | 122 | 123 | 124 | 125 | 126 | 127 | 128 | 129 | 37 |
| 50 | 158 | 159 | 160 | 161 | 162 | 163 | 164 | 165 | 166 | 37 |
| 51 | 195 | 196 | 197 | 198 | 199 | 200 | 201 | 202 | 203 | 37 |
| 52 | 232 | 233 | 234 | 235 | 236 | 237 | 238 | 239 | 240 | 37 |
| 53 | 13 | 14 | 15 | 16 | 17 | 18 | 19 | 20 | 21 | 37 |
| 54 | 50 | 51 | 52 | 53 | 54 | 55 | 56 | 57 | 58 | 37 |
| 55 | 87 | 88 | 89 | 90 | 91 | 92 | 93 | 94 | 95 | 37 |
| 56 | 124 | 125 | 126 | 127 | 128 | 129 | 130 | 131 | 132 | 37 |
| 57 | 161 | 162 | 163 | 164 | 165 | 166 | 167 | 168 | 169 | 37 |
| 58 | 198 | 199 | 200 | 201 | 202 | 203 | 204 | 205 | 206 | 37 |

FIG. 5D

| CYLINDER | 100 | 101 | 102 | 103 | 104 | 105 | 106 | 107 | 108 | DELTA |
|---|---|---|---|---|---|---|---|---|---|---|
| SECTOR | | | | | | | | | | |
| 59 | 235 | 236 | 237 | 238 | 239 | 240 | 241 | 242 | 243 | 37 |
| 60 | 16 | 17 | 18 | 19 | 20 | 21 | 22 | 23 | 24 | 37 |
| 61 | 53 | 54 | 55 | 56 | 57 | 58 | 59 | 60 | 61 | 37 |
| 62 | 90 | 91 | 92 | 93 | 94 | 95 | 96 | 97 | 98 | 37 |
| 63 | 127 | 128 | 129 | 130 | 131 | 132 | 133 | 134 | 135 | 37 |
| 64 | 164 | 165 | 166 | 167 | 168 | 169 | 170 | 171 | 172 | 37 |
| 65 | 201 | 202 | 203 | 204 | 205 | 206 | 207 | 208 | 209 | 37 |
| 66 | 238 | 239 | 240 | 241 | 242 | 243 | 244 | 245 | 246 | 37 |
| 67 | 19 | 20 | 21 | 22 | 23 | 24 | 25 | 26 | 27 | 37 |
| 68 | 56 | 57 | 58 | 59 | 60 | 61 | 62 | 63 | 64 | 37 |
| 69 | 93 | 94 | 95 | 96 | 97 | 98 | 99 | 100 | 101 | 7 |
| 0 | 100 | 101 | 102 | 103 | 104 | 105 | 106 | 107 | 108 | 37 |
| 1 | 137 | 138 | 139 | 140 | 141 | 142 | 143 | 144 | 145 | 37 |
| 2 | 174 | 175 | 176 | 177 | 178 | 179 | 180 | 181 | 182 | 37 |
| 3 | 211 | 212 | 213 | 214 | 215 | 216 | 217 | 218 | 219 | 37 |

←INDEX

FIG. 5E

TECHNIQUE FOR REDUCING OVERHEAD IN A DATA STORAGE SYSTEM

FIELD OF THE INVENTION

The invention relates in general to digital data storage systems and, more particularly, to a method for storing servo information on a storage medium in a digital data storage system.

BACKGROUND OF THE INVENTION

Disk drives are data storage devices that store digital data in concentric tracks on a rotating storage medium (i.e., the disk). Each of the concentric tracks is generally divided into a plurality of separately addressable data sectors. A transducer is used to transfer data between a desired track of the disk and an exterior environment. That is, during a write operation a transducer transfers data from an exterior environment to the desired track and during a read operation a transducer transfers information from the desired track to the exterior environment. Before data transfers can take place, however, the transducer must be moved to and centered above the desired track.

In a disk drive, the transducer is generally mounted on the end of an actuator arm which pivots about an axis in a fashion that allows the transducer to move radially across the disk surface. The actuator arm is coupled to a motor, such as a voice coil motor (VCM), that imparts motion to the actuator arm in response to a control signal. A servo system is used to control the movement of the transducer above the disk using servo signals read from a disk surface in the disk drive. Among other things, the servo signals generally indicate the present position of the transducer with respect to the disk. The servo system uses this information to determine how the transducer must be moved to center it above the desired track. The servo system then delivers a control signal to the motor to move the transducer accordingly.

Servo information is generally stored in a disk drive system in one of two ways, namely: sectored servo and dedicated servo. In a sectored servo system, servo information is stored in servo sectors on each track of each disk surface in the drive, interspersed with the stored user data. As the disk moves beneath the transducer, the transducer periodically samples the servo sectors to obtain the servo information for the servo system. In a dedicated servo system, the servo information is stored on a separate, dedicated disk surface which contains no user data. In this type of system, a dedicated transducer constantly reads the servo information from the dedicated surface.

In a disk drive system, servo information represents system overhead. That is, storage space which otherwise could be used to store additional user data must be set aside to store servo information for use in, among other things, locating the transducer. As is apparent, it is generally desirable to store as much user data as possible (i.e., minimize overhead) on a disk in a disk drive. If the amount of available servo information is reduced too much, however, servo positioning functions, among other things, could be adversely affected. Therefore, there is a need for a method and apparatus for storing servo information on a disk that requires less disk space than past systems.

SUMMARY OF THE INVENTION

The present invention relates to a method for storing servo information on a storage medium in a disk drive. The method includes combining multiple servo parameter values into a single parameter value which requires less storage space on the disk surface than would be required if the multiple servo parameter values were each separately stored on the disk surface.

In one aspect of the present invention, a method for storing servo information on a storage medium for use in a disk drive is provided. The method comprises the steps of: providing a storage medium having a plurality of concentric tracks, each of the tracks including a plurality of overhead sectors for storing overhead information; providing a first parameter value corresponding to a first overhead sector on a first track and having a first bit length; providing a second parameter value corresponding to the first overhead sector and having a second bit length; combining the first parameter value and the second parameter value to create a combined parameter value having a third bit length less than the sum of the first bit length and the second bit length; and storing the combined parameter value in the first overhead sector; wherein the method allows the servo information to be stored in a smaller area on the disk than would be required without the step of combining.

The plurality of overhead sectors can include, for example, transducer positioning information. The first and second parameter values can include a cylinder number and a sector number, respectively. The combining step can include adding the first and second parameter values or using an equation to combine the values. In one embodiment, a cylinder number and a sector number are combined using the following equation: combined parameter=(cylinder number+sector number*key) mod base, where key is a predetermined constant, L is the length of an associated grey code, and base is a constant equal to $2^L$. The second parameter value can be derived from an index pattern that provides an index indication for a particular track.

In another aspect of the present invention, a data storage disk is provided. The data storage disk includes: a data storage medium and first and second concentric tracks disposed upon a surface of the data storage medium, the first and second tracks being adjacent to one another with no tracks therebetween, each of the tracks including a plurality of data fields for use in storing user data and a plurality of overhead sectors for use in storing information other than user data, wherein selected overhead sectors within the first track are radially aligned with selected overhead sectors in the second track; wherein each of the selected overhead sectors in the first and second track includes a value representing the combination of at least two parameters corresponding to the selected overhead sector; wherein the value in a first selected overhead sector in the first track differs from the value in a second selected overhead sector that is radially aligned with the first selected overhead sector in the second track in only one bit position; wherein the value in the first selected overhead sector in the first track differs from the value in a third selected overhead sector in the first track in greater than one bit position, wherein there are no selected overhead sectors between the first and third selected overhead sectors. The plurality of overhead sector can include, for example, a plurality of servo sectors for storing transducer positioning information. The two parameters represented by the value stored in the overhead sector can include a cylinder number and a sector number.

In another aspect of the present invention, a method for storing servo parameters on a data storage medium having a plurality of concentric cylinders is provided. The method comprises the steps of: providing a cylinder number corresponding to a first cylinder on the storage medium; providing a sector number corresponding to a sector on the first cylinder; multiplying the sector number by a first constant to create a first product; adding the first product to the cylinder number to create a first sum; dividing the first sum by a second constant resulting in an integer multiplier value and a remainder value, wherein the sum of the remainder value and the product of the integer multiplier value and the second constant equals the first sum; and storing the remainder value from the step of dividing in a servo field on the data storage medium, the servo field corresponding to the sector on the first cylinder. The step of dividing can include dividing the first sum by $2^L$. The step of choosing can include choosing the first constant so that remainder values stored in adjacent servo fields on a common track on the data storage medium differ from one another in greater than one bit position. This reduces the chances that transducer positioning errors will be made based on identical parameter values being located inclose proximity to one another on the disk surface.

In yet another aspect of the present invention, a method for storing servo information on a storage medium for use in a disk drive is provided. The method comprises the steps of: providing a storage medium having a plurality of concentric tracks, each of the tracks including a plurality of servo fields for storing servo information, each servo field corresponding to one or more data storage locations; providing a first servo parameter corresponding to a first data storage location; providing a second servo parameter corresponding to the first data storage location; adding the first servo parameter and the second servo parameter to create a combined parameter; and storing the combined parameter in a servo field corresponding to the first data storage location. In one embodiment, the first servo parameter includes a cylinder number for the first data storage location and the second servo parameter includes a sector number for the first data storage location.

In still another aspect of the present invention, a data storage system is provided. The data storage system comprises: a data storage disk having a plurality of concentric tracks, each track including a plurality of servo fields having servo information, at least one of the servo fields including a value representing a combination of at least two servo parameter values; transducer means for use in reading servo information from the servo fields; means for moving the transducer means relative to the data storage disk; means for estimating the present location of the transducer means relative to the data storage disk; and means for using the value from the at least one servo field to determine whether the location estimate is correct. The two servo parameter values can include a cylinder number and a sector number. The means for estimating can include a means for estimating the present cylinder and sector of the transducer. The means for using can include means for comparing the estimated cylinder and sector to a value from one of the servo sectors.

BRIEF DESCRIPTION OF THE DRAWINGS

FIG. 3 is a graph illustrating stored servo parameter values in accordance with one embodiment of the present invention and also illustrating an example of how the stored parameter values can be used as an index indication;

FIG. 4 is a graph illustrating stored servo parameter values in accordance with another embodiment of the present invention and also illustrating an example of how the stored parameter values can be used to detect slipping in a servo sector counter.

DETAILED DESCRIPTION

The present invention relates to a methodfor storing servo information on a storage medium in a disk drive. The method includes combining multiple servo parameter values corresponding to a particular data storage location into a single "combined" value that requires less storage space on the disk surface than would be required if the multiple servo parameter values were each separately stored on the disk surface. After reading the combined value from the disk, any one of the individual servo parameter values making up the combined parameter can be recovered if the other individual parameter values are known. Alternatively, the combined parameters may be used to check the accuracy of software position estimators. In this regard, the present invention is especially apt for use in id-less disk drive systems.

Figure 1:
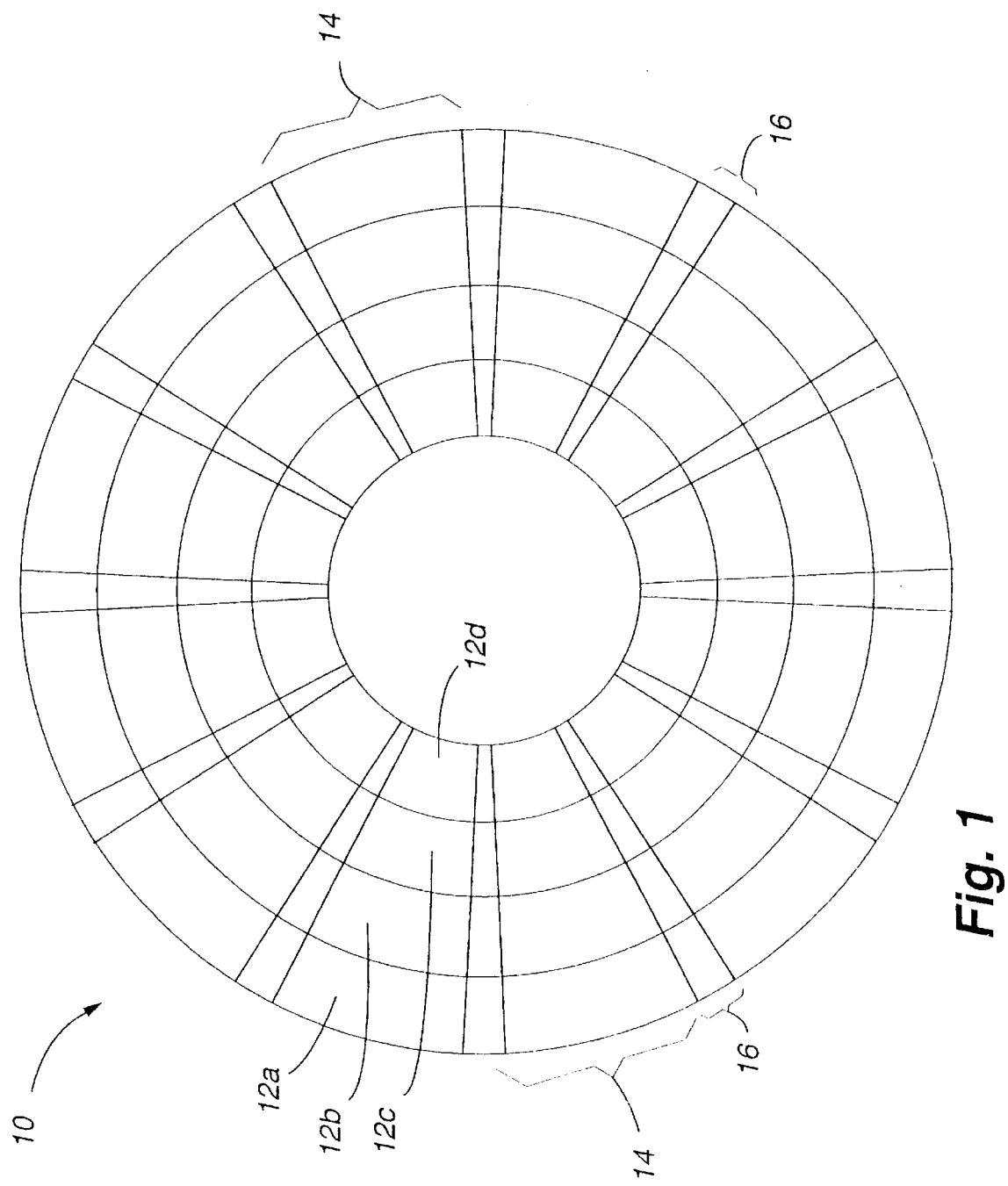
FIG. 1 is a top view of a data storage disk upon which the present invention can be practiced.

FIG. 1 illustrates a storage disk 10 which may include servo positioning information stored in accordance with one embodiment of the present invention. The disk 10 includes a plurality of concentric tracks 12a–12d for storing user data and servo information (i.e., the disk 10 is for use in a sectored servo system). The user data is stored in data sectors 14 and the servo information is stored in servo sectors 16 in each of the tracks. During operation of a disk drive including the disk 10, a transducer is used to read and write user data from and to the disk 10. The transducer is held above a desired track of the disk 10 while the disk 10 rotates underneath. When a desired data sector 14 is determined to be directly under the transducer, the appropriate data transfers can take place.

Figure 2:
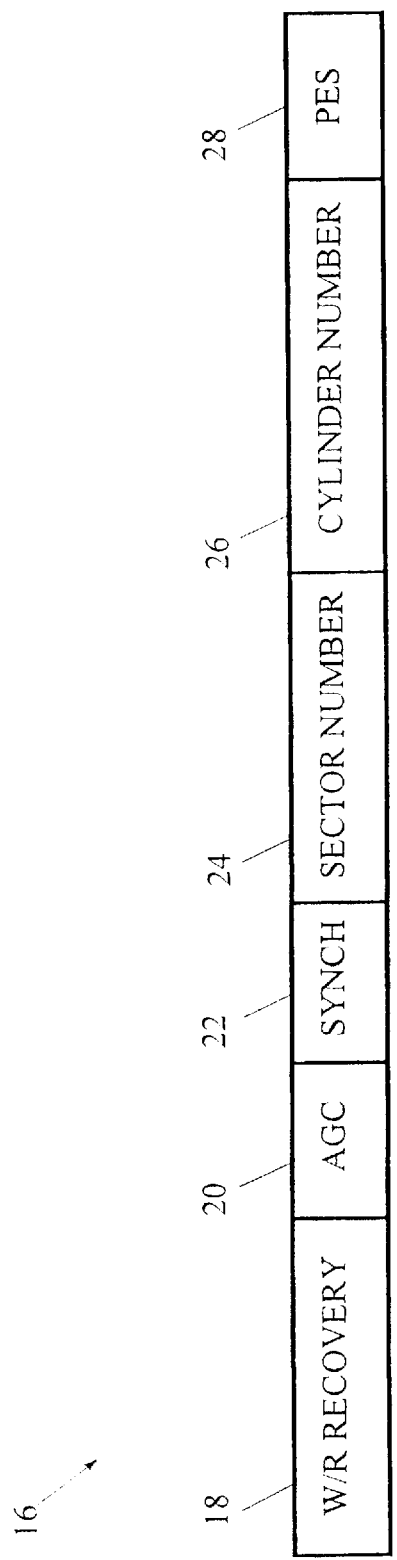
FIG. 2 illustrates a typical servo sector of the prior art.

As the disk 10 rotates beneath the transducer, the transducer periodically samples the servo sectors 16. The servo samples are used by the servo system to perform, among other things, location and centering of the transducer above a desired track of the disk 10. In this regard, the servo samples include information regarding the location of the transducer above the disk surface. For example, FIG. 2 illustrates the contents of a typical servo sector 16 of the prior art. As illustrated, the servo sector 16 includes a write/read (W/R) recovery field 18, an automatic gain control (AGC) field 20, a synchronization field 22, a sector number field 24, a cylinder number field 26, and a position error signal field 28. The W/R field 18 is used by the disk drive to transition from writing data to a previous data field to reading the servo information in the present servo sector. The AGC field 20 is used to set the gain of the read/write channel of the disk drive for optimal performance. The synchronization field 22 is used in synchronizing a system clock so that the sector and cylinder number fields 24, 26 can be read and the PES field 28 can be located. The sector number field 24 includes one or more data sectors associated with the servo sector 16. In this regard, the sector number field is indicative of the current circumferential position of the transducer with respect to the disk. The cylinder number field 26 includes an address identifying the particular track on which the servo sector 16 is located. It is generally desired that at least the cylinder numbers on the disk 10 be gray coded, i.e., the cylinder number values corresponding to adjacent tracks differ from one another in only a single bit position. The PES field 28 is used by the disk drive to center the transducer above the track during read and write operations. In addition to the above fields, the servo sector 16 can include many other types of servo information fields.

As an alternative to sector number field 24, some drives utilize an index bit in each servo sector 16 to determine a present circumferential transducer position about a disk. The index bit is generally set to a logic one in only one servo sector per track and is set to logic zero in all other servo sectors. When the transducer detects the servo sector having an index bit of logic one on a given track, the system software starts counting each servo sector traversed from that point on. This "sector count" is then used as an indicator of current circumferential transducer position. In a similar fashion, a "cylinder count" may be used to indicate the current radial position of the transducer. A disk drive that lacks certain transducer positioning information in its data sectors (such as cylinder and/or sector number) and instead uses servo sector and software to track that aspect of transducer position is known as an id-less disk drive.

As is apparent from FIGS. 1 and 2, the servo sectors 16 can occupy a substantial portion of the recording surface of the disk 10. As more servo information is located on the recording surface of the disk 10, less user data can fit on the disk. In conceiving of the present invention, it was determined that by combining multiple servo parameters into a single parameter having a length shorter than the combined length of the individual parameters, the required servo information could be stored in a smaller area on the disk, thus decreasing system overhead. In addition, it was determined that further benefits could also be achieved by combining servo parameters in accordance with the present invention.

Disk drives normally maintain software estimates relating to the present location of the transducer. Some disk drives, such as id-less disk drives, rely solely on these estimates to position the transducer during, for example, seek operations. Although the estimates are generally accurate, events may occur which introduce error into the estimates. The present invention provides a method for rapidly and continuously checking the accuracy of the estimates that does not require the addition of any overhead. For example, at any servo sample time, the servo system can convert the software estimates to the same form as the servo parameters and combine the converted estimates in the same manner that the servo parameter values are combined. The value of the combined estimates can then be compared to the value of the combined servo parameters read from the servo sector. If the value of the combined estimates is different from the value of the combined parameters stored on the disk, an error probably exists in at least one of the estimated values. Remedial action can then be taken to restore the accuracy of the estimated values.

In accordance with one embodiment of the present invention, multiple servo parameter values associated with a given servo sector are added together and the sum is then stored in the associated servo sector. For example, the sum of the cylinder number and sector number associated with a given servo sector can be stored in the servo sector. Then, when the servo sector is later sampled by a transducer, either of the two parameter values can be recovered, if the other one is known, by subtraction of the known parameter value from the sum. If software estimators are used, such as in an id-less disk drive, one of the two parameter values will generally be known by the servo system at any one time. It should be appreciated that values for any two or more servo parameters may be added and stored in accordance with the present invention to reduce overhead and thereby increase the space available for new data in a disk drive system. The parameters may be added using, for example, exclusive-OR circuitry or modulo arithmetic.

In accordance with another embodiment of the present invention, servo parameters are combined in a manner that produces an index indication on the disk without increasing overhead. For example, the cylinder number associated with a given track can be added to a parameter that varies periodically along the track with a period of n servo sample times. The resultant values can then be stored in the corresponding servo sectors on the track. If the number of servo sectors around the track is not an integer multiple of n, then the values stored in the servo sectors on the track will form a periodic pattern around the track that includes one incomplete cycle The one incomplete cycle in the pattern is used by the disk drive as an index indication for the track. This technique may be used, for example, in id-less disk drives to replace the index bit and thus reduce overhead on the disk. It should be appreciated that the technique can be used in conjunction with any of the parameters normally stored in the servo sectors on the disk and is not limited to use with the cylinder numbers.

FIG. 3 illustrates the present embodiment implemented in a track having 38 sectors. As illustrated in the figure, the cylinder number (i.e., 6) is the same for each sector on the track. For each sector, the cylinder number is added to a parameter value that varies across the track in a sawtooth pattern having a period of 4 servo sample times, and the sum is stored in the corresponding servo sector. Because the number of sectors on the track (i.e., 38) is not an integer multiple of 4, the final cycle of stored values is incomplete (i.e., the values go from 6 to 7 and back to 6 as the transducer goes from sector 37 to sector 1). The transition from 7 to 6 of the stored values can therefore be used as an index indication for the track and no additional overhead is required to provide such indication.

If the servo system maintains a sector count from index, the cylinder number can be determined at any sector by subtracting the sector count MOD n from the stored value read from the disk. For example, if the stored value is 9 and the sector counter indicates a 15 then, if no errors exist, the cylinder number is equal to 9−(15 MOD 4)=6. Alternatively, if the cylinder number is known, the stored values may be used to check the accuracy of the sector counter by subtracting the known cylinder number from the stored value and comparing the result to the present sector count MOD 4. If the numbers do not match, a slip in the sector count is assumed and the current read or write operation can be stopped until an accurate sector count has been restored. For example, if the cylinder number is 6 and the stored value is 9, then the sector count MOD 4 should equal 9−6=3. If it does not, then a slip in the sector counter is assumed.

In another embodiment of the present invention, a first portion of a parameter is added to a second portion of the same parameter and the sum of the two portions is stored in the appropriate servo sector. Therefore, the full parameter value is available on the disk, but much less disk space is used to store the parameter, thereby increasing the space available for user data. For example, in a system which uses a twelve bit cylinder number, the first six bits (i.e., the most significant bits (MSBs)) can be added to the last six bits (i.e., the least significant bits (LSBs)) and the result can be stored in the appropriate servo sector. Again, if either of the values is known, the other can be calculated by subtraction. Using this technique significantly reduces the disk space required to store cylinder information on a track, yet allows the full cylinder address to be available in every servo sector. It should be appreciated that the above described technique can be applied to any of the various servo parameters normally stored in the servo sectors and is not limited to the cylinder number.

FIG. 4 is a graph illustrating another parameter value storage technique in accordance with the present invention and an example of how the technique can be used to detect a slip in the sector counter. The technique combines three parameter values for each sector of a track and stores the resultant sum in the appropriate servo sector on the track. The first value represents the LSBs of the cylinder number for the track, the second value represents a single bit from the MSBs of the cylinder number for the track, and the third value represents a variable index pattern, as described above. As illustrated in the figure, the LSB value remains constant across the track (i.e., LSB portion=6). The MSB value changes from sector to sector in a repetitive pattern, as does the index value. The index pattern is the same sawtooth pattern described previously for providing an index indication to the servo sectors. Again, combining the three parameter values into one value decreases the amount of disk space required to store the parameters, thereby increasing the space available for user data.

When the servo sectors are read during a read or write operation, the sector counter may miss a sector and hence indicate an inaccurate reading. The present invention allows the missed counter update to be detected and the incorrect counter value to be corrected. In this way, the disk drive does not have to wait for the next index indication before an accurate count is available. In FIG. 4, the X indicates a missed sector counter update. As illustrated, when an update of the sector counter is missed, the sector counter indicates the next successive counter number on the servo sector following the missed sector (i.e., the sector counter indicates a count of 5 in sector 7 rather than in sector 6). This error translates into an error in the COUNTER MOD 4 values calculated by the system (i.e., the COUNTER MOD 4 values for sectors 7 and 8 are 1 and 2, respectively, rather than 2 and 3). When the COUNTER MOD 4 values are subtracted from the stored values, errors result based on the faulty COUNTER MOD 4 values (i.e., the "STORED VALUE–COUNTER MOD 4" values for sectors 7 and 8 are both 7, rather than 6).

The servo system subtracts what it believes to be the proper MSB value from the "STORED VALUE–COUNTER MOD 4" information for each sector. However, because an update of the sector counter has been missed, the servo system assumes that the MSB value corresponding to sector 6 belongs to sector 7 and the MSB value corresponding to sector 7 belongs to sector 8. The system subtracts the assumed MSB value from the "STORED VALUE–COUNTER MOD 4" value for each sector, resulting in a calculated LSB value. An error is then detected wherever the calculated LSB value varies from the known LSB value (i.e., 6). In the example of FIG. 4, the system detects the missed sector count update at servo sector 8 based on the faulty LSB value of 7. Note that there is a delay of 2 servo sector times until detection. Because there is a higher probability that the sector counter has missed an update than that the transducer has erroneously moved to another track, the system assumes that the faulty LSB value was caused by the former. As illustrated in FIG. 4, the system can compensate for the missed sector counter update by adding an extra one to the sector counter during sector 9, thereby restoring the sector counter to the proper reading. Alternatively, the system may enter a recovery mode after the error is detected, during which a resynchronization procedure is performed.

In a system where the cylinder number and the sector number for a particular sector are added together to form a sum which is stored in the corresponding servo sector of the disk, as described above, a problem arises in that the stored value in a particular servo sector is the same as the value in a servo sector one cylinder and one sector removed. This is because the cylinder numbers increase by one from track to track and the servo sector numbers increase by one from sector to sector. Having identical servo values stored in close proximity to one another on the disk creates a problem when performing seek or track following operations. For example, if the transducer location were off by one sector and one track, the servo system would believe that the transducer was above the desired location. This could result in user data being read from or written to the wrong location. Therefore, in accordance with another embodiment of the present invention, a method is provided for ensuring that identical servo values are not stored in proximity to one another on the surface of the disk.

The method comprises scrambling the sector number, before combining it with the cylinder number, using a specially selected key value. The key value is selected to achieve a large distance between identical servo parameter values on the surface of the disk. In one embodiment of the present invention, the following equation is used to perform the scrambling:

$$\text{stored parameter} = (\text{cylinder} + \text{sector} * \text{key}) \text{ MOD base}$$

where stored parameter is the value to be stored in the servo sector on the disk, cylinder is the cylinder number corresponding to the servo sector, sector is the sector number corresponding to the servo sector, key is the specially selected key value, and base is a constant equal to $2^N$, where N is the number of bits in the gray code. The above equation always results in a legal gray code across cylinders on the disk, i.e., the stored servo parameter on a first cylinder in a first sector always varies in only one bit position from the stored servo parameter on a second, adjacent cylinder in the same sector. In addition, the equation provides an index indication on each track of the disk and a full sector number to each sector of each track with no additional overhead. The equation introduces very little computational overhead to the system, particularly if the system includes processor means having a fast multiplication capability.

Figure 5A:
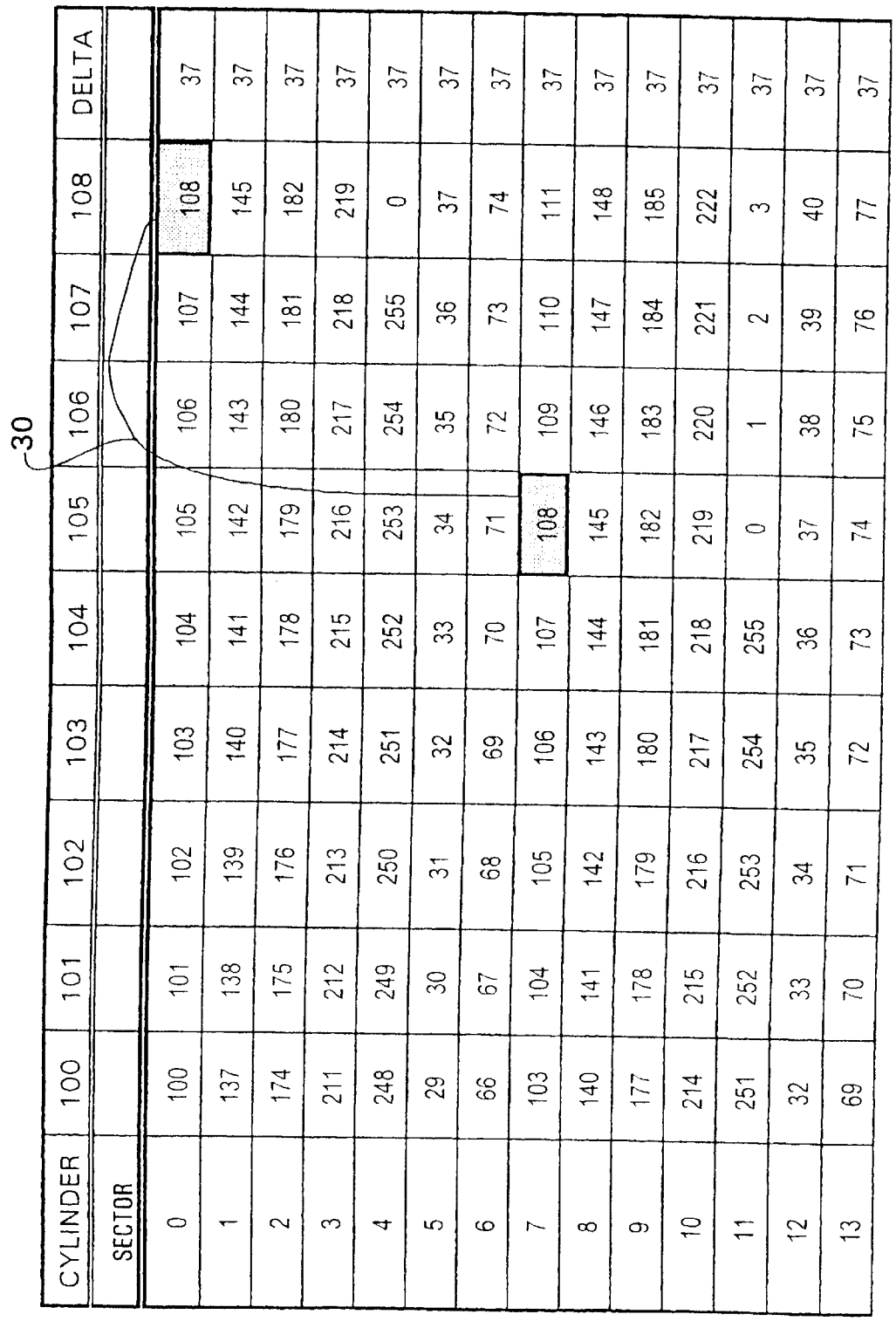
FIG. 5 is a graph illustrating stored servo parameter values in accordance with yet another embodiment of the present invention and also illustrating an example of how the stored parameter values can be used as an index indication.

FIG. 5 illustrates the servo parameter values stored on a disk using the above equation for a system using an 8-bit gray code (i.e., base=256). The key value was empirically chosen to be 37. As described above, the stored parameter values always differ by one across adjacent cylinders. Because the values are gray coded, a difference of one indicates that the parameters across adjacent cylinders differ in only one digital position. In addition, identical servo parameter values are located at relatively large distances from one another, thereby substantially decreasing the probability that a location error will be made. For example, the nearest identical values 30 on the disk of FIG. 5 are located 3 cylinders and 7 sectors away from each other. There is a very low probability that these values would be mistaken for one another.

The servo parameter values of FIG. 5 also provide an index indication which may be used to start a current sector counter. The index is determined by subtracting a most recently read servo parameter value from a next most recently read servo parameter value within a single cylinder. When the resultant value is different from the key value, index has been located. For example, as illustrated in FIG.

5, the difference between adjacent servo parameter values within a common cylinder is a constant 37 across the cylinder until the transition from sector 69 to sector 0. At this transition, the difference is 7 which indicates that this is the index point.

It should be appreciated that the techniques disclosed herein are not limited to use in disk drives using the servo configuration illustrated in FIG. 1, but may be implemented in drives using other servo configurations, such as fixed block architectures, banded recording, and split data field configurations. The techniques may also be implemented in drives utilizing dedicated servo systems.

Although the present invention has been described in conjunction with several embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A data storage disk for use in a disk drive, comprising:
   a data storage medium; and
   a plurality of concentric tracks disposed upon a surface of said data storage medium, said plurality of tracks including pairs of adjacent tracks, each of said plurality of tracks including a plurality of data fields for use in storing user data and a plurality of overhead sectors for use in storing information other than user data, wherein selected overhead sectors within adjacent tracks are radially aligned with one another;
   wherein each of said selected overhead sectors in said adjacent tracks includes a value representing the combination of at least two parameters corresponding to said selected overhead sectors;
   wherein said values in said selected overhead sectors in adjacent tracks differ from one another in only one bit position for all adjacent tracks on the disk;
   wherein, for all of the plurality of tracks, said values of said adjacent overhead sectors within a common track differ from each other in greater than one bit position.

2. The disk, as claimed in claim 1, wherein:
   said plurality of overhead sectors includes a plurality of servo sectors, each including transducer positioning information.

3. The disk, as claimed in claim 1, wherein:
   said values in said adjacent overhead sectors differ by a relatively large numerical value.

4. The disk, as claimed in claim 3, wherein:
   a relatively large positional distance separates overhead sectors having identical stored values.

5. The disk, as claimed in claim 1, wherein:
   said at least two parameters includes a cylinder number and a sector number.

6. The disk, as claimed in claim 1, wherein:
   a relatively large positional distance separates overhead sectors having identical stored values.

7. The disk, as claimed in claim 1, wherein adjacent overhead sectors on a common track differ from one another by a constant value, except for one pair of adjacent overhead sectors on the common track.

8. A method for storing servo parameters on a data storage medium having a plurality of concentric cylinders, said method comprising the steps of:
   providing a cylinder number corresponding to a first cylinder on said storage medium;
   providing a sector number corresponding to a sector on said first cylinder;
   multiplying said sector number by a first constant to create a first product;
   adding said first product to said cylinder number to create a first sum;
   dividing said first sum by a second constant resulting in an integer multiplier value and a remainder value, wherein the sum of said remainder value and the product of said integer multiplier value and said second constant equals said first sum; and
   storing said remainder value from said step of dividing in a servo field on said data storage medium, said servo field corresponding to said sector on said first cylinder.

9. The method, as claimed in claim 8, wherein:
   said step of storing includes encoding said remainder value using a gray code having a length of L bits.

10. The method, as claimed in claim 9, wherein:
    said step of dividing includes dividing said first sum by $2^L$.

11. The method, as claimed in claim 9, further comprising the step of:
    choosing said first constant so that remainder values stored in adjacent servo fields on a common track on said data storage medium differ from one another in greater than one bit position.

12. The method, as claimed in claim 11, wherein:
    remainder values stored in adjacent servo fields on a common track on said data storage medium differ from one another by a constant value, except for one pair of adjacent servo fields on the common track.

13. The method, as claimed in claim 9, further comprising the step of:
    choosing said first constant so that remainder values stored in adjacent servo fields on a common track on said data storage medium differ from one another in greater than one bit position for each track on the disk.

14. The method, as claimed in claim 8, wherein:
    servo fields having identical remainder values are separated by a relatively large positional distance.

* * * * *